US010346725B2

(12) United States Patent
Weller et al.

(10) Patent No.: US 10,346,725 B2
(45) Date of Patent: Jul. 9, 2019

(54) PORTABLE APPARATUS AND METHOD FOR DECISION SUPPORT FOR REAL TIME AUTOMATED MULTISENSOR DATA FUSION AND ANALYSIS

(71) Applicant: AIRFUSION, INC., Lincoln, MA (US)

(72) Inventors: Whitney T. Weller, Exeter, NH (US); Gregory B. Pepus, Silver Spring, MD (US)

(73) Assignee: AirFusion, Inc., Andover, MA (US)

( * ) Notice: Subject to any disclaimer, the term of this patent is extended or adjusted under 35 U.S.C. 154(b) by 93 days.

(21) Appl. No.: 15/813,750

(22) Filed: Nov. 15, 2017

(65) Prior Publication Data

US 2018/0239991 A1    Aug. 23, 2018

Related U.S. Application Data

(63) Continuation-in-part of application No. PCT/US2016/032687, filed on May 16, 2016.

(60) Provisional application No. 62/162,586, filed on May 15, 2015, provisional application No. 62/180,393, filed on Jun. 16, 2015.

(51) Int. Cl.
| | | |
|---|---|---|
| *G06T 1/00* | (2006.01) | |
| *G06K 9/62* | (2006.01) | |
| *G06F 16/907* | (2019.01) | |
| *G06K 9/00* | (2006.01) | |
| *G06F 17/18* | (2006.01) | |
| *G06K 9/32* | (2006.01) | |
| *G06K 9/46* | (2006.01) | |
| *G01L 1/00* | (2006.01) | |

(52) U.S. Cl.
CPC ......... *G06K 9/6289* (2013.01); *G06F 16/907* (2019.01); *G06F 17/18* (2013.01); *G06K 9/0063* (2013.01); *G06K 9/00637* (2013.01); *G06K 9/00651* (2013.01); *G06K 9/00657* (2013.01); *G06K 9/3241* (2013.01); *G06K 9/4604* (2013.01); *G06K 2009/4657* (2013.01)

(58) Field of Classification Search
CPC .......... G06K 9/00; G06F 16/00; G01L 1/2218
USPC ....................................................... 382/100
See application file for complete search history.

(56) References Cited

U.S. PATENT DOCUMENTS 7,925,995 B2 * 4/2011 Krumm .................. H04W 4/02
                                                              715/855

* cited by examiner

*Primary Examiner* — Abolfazl Tabatabai
(74) *Attorney, Agent, or Firm* — David J. Kulik

(57) ABSTRACT

The present invention encompasses a physical or virtual, computational, analysis, fusion and correlation system that can automatically, systematically and independently analyze collected sensor data (upstream) aboard or streaming from aerial vehicles and/or other fixed or mobile single or multi-sensor platforms. The resultant data is fused and presented locally, remotely or at ground stations in near real time, as it is collected from local and/or remote sensors. The invention improves detection and reduces false detections compared to existing systems using portable apparatus or cloud based computation and capabilities designed to reduce the role of the human operator in the review, fusion and analysis of cross modality sensor data collected from ISR (Intelligence, Surveillance and Reconnaissance) aerial vehicles or other fixed and mobile ISR platforms. The invention replaces human sensor data analysts with hardware and software providing two significant advantages over the current manual methods.

17 Claims, 10 Drawing Sheets

DATA FUSION SERVICES (35)

COLLECTION INTERFACE SERVICES
- Raw Video
  - -SDHD, TSC
  - -DIV
- Raw Radar
- Raw Spectral
- Raw LIDAR
- Logging

INGEST NORMALIZATION SERVICES
- H.264 (streaming)
- MP4 (streaming)
- PNG
- TIFF
- JPG
- Other preferred formats

ANALYTICAL SERVICES
- Video enhancement
- Video stabilization
- Video obj. recognition
- Image obj. recognition
- Spectral exploitation
- WAMI tracking

FUSION SERVICES
- Sensor correlation
- GPS pixel registration
- Industry Exemplars
- Tracking/Tracks
- Spatial Positioning
- Event Correlation
- Smart Agents

DECISION SUPPORT, VISUALIZATION, REPORTING
- Decision Support
- Geospatial mapping
- Geospatial alignment
- Fixed Reports
- Question/Answer
- Search
- Cataloging (Product)

SYSTEM SERVICES (36)

STORAGE SERVICES
- Pixel
- Temporal
- Spatial
- Relational
- Text
- Logging

DATA AND EVENT SERVICES
- Content storage
- Metadata storage
- RDBMS
- Mongo DB
- Data Orchestration
- Logging

NETWORK SERVICES
- Line Of Site
- Satellite
- TCP/IP
- Mesh
- Least cost router
- Logging

SCHEDULING SERVICES
- Task management
- Task definition
- Scripting support
- Scheduling
- Logging

DIRECTORY SERVICES
- Naming
- Mapping

LOGGING SERVICES
- All Systems Agents

CONFIGURATION MGMT. SERVICES
- All Systems

SECURITY SERVICES
- Users, Roles
- Encryption
- Key Mgmt.

FIG. 4

Example of one method. - Combine Sensor Target Match Detection Index (DI) and sensor Quality Factor (QF) Where DI is normalized resulting in sensor sensor specific Pd based on the exemplar/target match.

PORTABLE APPARATUS AND METHOD FOR DECISION SUPPORT FOR REAL TIME AUTOMATED MULTISENSOR DATA FUSION AND ANALYSIS

CROSS-REFERENCE TO RELATED APPLICATIONS

This application is a continuation-in-part of International Application No. PCT/US2016/032687, filed May 16, 2016, now Publication No. WO 2016/187112, which claims priority benefit of U.S. Provisional Application Nos. 62/162,586 filed May 15, 2015 and 62/180,393 filed Jun. 16, 2015, each of which is hereby incorporated by reference into this application.

BACKGROUND AND INTRODUCTION TO THE INVENTION

For applications requiring detection support systems employing sensors, many performance requirements can be met only when data from multiple sensors or time sequenced measurements from a single sensor are combined. This process of combining data has been called sensor correlation and fusion, or simply data fusion. Data fusion can associate, correlate, and combine information from single and multiple sensor sources to determine a refined location and matched identity estimates for observed elements in an image, for example. It can employ advanced mathematical inference techniques to reduce false matches inferred from the data, reduce dependence on conditions, control for known or assumed inefficiencies in the data, and generally lead to a more reliable system of matching elements detected from a sensor in complex environments. The data fusion process can continuously refine the estimates and matching parameters and can evaluate the need for additional sensor data.

As the performance requirements increase (e.g. the demand for higher detection performance at lower false alarm rates) and targets become more difficult to detect (e.g. low observability), there is a greater demand to expand the dimensionality of information acquired—driving the need for multiple sensors and the combination of that data. This demand to expand the time and space dimensionality of sensor data adds at least two problems: (1) sensor data must be integrated and coordinated to maximize the overall system measurement process, and (2) processes are required to efficiently and accurately correlate and fuse data from a variety of sensors. As noted above, data fusion is a multi-level, multifaceted process dealing with, for example, the registration, detection, association, correlation, and combination of data and information from multiple sources to achieve a refined status and identity estimation, and with the complete and timely assessments of the environmental situation(s) involved with each data set (including targets and opportunities). Sensors produce individual observations or measurements (raw data) that must be placed in proper context first to create organized data sets (information) and then evaluated to infer higher-level meaning about the overall content in the information (knowledge).

In one example of the present invention, a data fusion system combines synthetic aperture radar (SAR) and hyperspectral (HS) data. The SAR and HS sensors produce time-sampled data. The SAR data is processed to form an image, and the HS data is processed to form multilayer imagery: these images are both registered and then combined to produce information in the form of an image database. The image database is evaluated to infer the details of interest to government and commercial customers associated with, for example, vegetation, human activities, facilities and targets as desired by the end user.

Current ISR analytical and data fusion processes often seek information from multiple sensors and sources in order to achieve improved inferences over those achieved from only a single sensor. For example, evaluating the outputs from a color camera and a radar system in theory provides twice as much data over just the camera alone, reduces uncertainty, reduces false positives and improves the overall amount of accurate information available for decision making.

Analytical and data fusion systems typically use a variety of algorithms and techniques to transform the sensor data in order to detect, locate, characterize, and identify objects and entities of interest such as geospatial location, vehicles, buildings, plant and equipment etc. These algorithmic techniques include signal and image processing, statistical estimation, pattern recognition and many other techniques (see D. L. Hall and R. J. Linn, "Algorithm selection for data fusion systems," Proceedings of the 1987 Tri-Service Data Fusion Symposium, APL Johns Hopkins University, Laurel, Md., Vol. 1, pp. 100-110, June 1987).

As explained below, the present invention is an improvement over the past methods and systems as the analysis occurs in near real time, can produce even higher levels of probability of detecting a desired results, such as a detection event or monitoring data, and allows an operator to focus on the results of the fusion of data rather than on a specific sensor.

SUMMARY OF THE INVENTION

The invention improves detection and reduces false detections compared to existing systems using portable apparatus or cloud based computation and capabilities designed to reduce the role of the human operator in the review, fusion and analysis of cross modality sensor data collected from ISR (Intelligence, Surveillance and Reconnaissance) aerial vehicles or other fixed and mobile ISR platforms. The invention replaces human sensor data analysts with hardware and software providing at least two advantages over the current manual methods. First, the invention provides an improvement in that focus the human operator can focus on the decision-making process and not the analysis, fusion or correlation processes. Historically, these processes have required a trained expert on each specific sensor to interpret the sensor output. Likewise, each human analyst is focused on interpretation of a different sensor technology. Due to the sheer volume of information a dedicated resource is present for each sensor and trained to find signatures of specific targets. Simply put, human operators can't cognitively accommodate the volumes of data to be interpreted in a dynamic, real-time review of multiple sensor output. With current technology, computers can accurately review visual and pixel data output automatically without a human in the loop and provide meaningful analytical target identification results.

A second improvement is to provide improved probability of detection (Pd) of desired targets through a novel method of calculating and combining Pd from each sensor. Once automatic target detection and a detection probability is determined by the apparatus and methods of the invention, pixel and Meta data fusion and correlation provide improved detection results to the user. The invention combines and presents normalized and unified output to the human decision maker. The resultant output of the invention provides a compilation of information that operators need in order to make timely decisions for whatever government or industrial detection/monitoring they are pursuing. In the portable embodiment, the invention incorporates a novel method, apparatus and system for receiving stored or near real-time streaming data then subsequently performs computational analysis of surveillance or monitoring Meta data, image and sensor data. The invention comprises a method, apparatus and software system that assist operators to detect objects and conditions of interest. The invention greatly improves detection compared with current technology where individual sensor outputs are viewed and analyzed individually or fused into a single image where trained human analysts interpret the data. The past analysis process, using human subject matter experts, is difficult, subjective and prone to error due to fatigue and lack of comparison to a common library of examples (exemplars). The invention presented here achieves consistent, high quality detection results and a high probability of detection (Pd) and greatly reduced probability of false alarm (Pfa).

In one aspect, the invention comprises or incorporates two main concepts: one is simultaneously collected data; and the second the improved method of fusion of both streaming or collected intelligence, surveillance and reconnaissance (ISR) incoming independent sensor data, which is collected from the same point of origin, and while viewing the same scene at the same time, and the novel approach of using matches of the data from individual sensors with libraries of known examples (ground truth). The data is tagged as to the machine identification of the object or event and a probability of detection is calculated and attached to the object/event index associated with that specific detection. This is done across one and/or many sensor technologies, where the individual sensor or sensor suite is co-located in a fixed location or mobile platform, including, but not limited to, small unmanned remotely piloted aerial systems (RPAS), conventional aircraft, ground vehicles, and fixed sensor platforms. Co-location improves one of the purposes of automated decision support for identification matching and detecting the current status, event or condition of objects. The detection probabilities associated with detection of a single object or event is evaluated using detection libraries that match and tag the identity of the detection. The individual sensor detections and their associated probability of detection are then fused both in pixel image and in detection probability. The invention thus fuses images of a detection at the identical time for one or many sensors, producing a multi-layer stack of detection data. The data stack has associated with it the detection probability associated with each detection layer (sensor). The invention then concatenates the probability of detection for each individual sensor mode into a fused image and Meta data file containing the composite probability of detection. The result being that the detection is verified using detections in the individual sensor modes while the probability of detection and reduction of false alarms is enhanced by mathematically combining detection results across multiple sensor technologies (modes—HD video, IR, SAR, Hyperspectral, etc.) and detection qualities (rated, or with a probability scale or rating, taking into account the detection under current environmental conditions and sensor status). An example of this is as follows:

Case 1. On a clear day—video and photographic image data from camera apparatus can identify an object—a car.

Case 2. On a foggy day or in night conditions, the video and photographic image data is not conclusive that there is a car in the frame. On the same foggy day from the same viewing angle, the use of synthetic aperture radar (SAR) will show a car clearly through the fog. On the same foggy day, an infrared sensor will show a heat signature from the car and thus give an indication that there is something warm with a car shape.

Thus, associating a Pd with each detection, in Case 1 the Pd is 98.x % based on video or photographic image based on lookup in an optical image exemplar library. In Case 2 the Pd is 10% based on video or photographic lookup in the detection library, 90+% based on matching SAR data to a SAR exemplar detection data library, 55% based on matching IR signatures with the IR exemplar detection data library. Accordingly, sensors operate better or worse depending on the technology's ability to penetrate the environmental conditions and "see" the object or event. The invention presented herein combines the best detection knowledge base in each sensor technology, calculates the Pd for each, and then fuses and combines the results of image and Pd to offer the system a detection result that is both expert and has a high Pd and a low Pfa.

After the initial population of the libraries with known examples or ground truth detection data for each of the sensor types and across as many objects as the user wishes to find, the system can continue to machine learn in real time as it is used leading to continuous improvement until Pd approaches the goal of 99% or higher, and a Pfa of <1%. The invention eliminates many hours of human review of sensor data and therefore provides great value. The invention improves the Pd and reduces Pfa saving large amounts of time and energy associated with clearing false alarms or missing a detection of critical object or events.

The method and system can be incorporated into or realized on portable high performance computer (HPC) hardware, producing near real time filtering, alarming and reporting of data to the user or data can be post processed remotely using a portable apparatus client (mobile tablet or laptop computer) capable of storing one or multiple sensor streams for upload to the cloud HPC cloud computing platform producing non-real time filtering, alarming and reporting of data to the user. Both embodiments support detection of target objects/events enabling user designated objects/events to be identified using sensor automatically by this novel system. The system input is sensor, image and video data. The system outputs are detection events, a system calculation of the probability of correct detection of the object or event and classification of material characteristics, for example, people, patterns, scenes, objects and events by applying probability based automatic target recognition (ATR). It will be apparent to the skilled operator that applications where a review of large amounts of data is required will benefit greatly from automatic detection and reporting of information of interest afforded by the invention, thus serving the needs of users across many industries, including wind energy (wind turbine blade inspection), oil and gas pipeline monitoring, security applications, HVAC power generation and power line, precision agriculture, maritime and fishery management, wildlife conservation and protection, law enforcement (e.g. outgassing from methamphetamine chemistry), mining, watershed, environmental monitoring, and transportation infrastructure survey.

Embodiments of the invention provide for combined detection of ISR events of interest with low false positives across different sensor modalities correlated to geo-location and time. Objects and events are autonomously detected, interpreted and then reported to an operator screen through matching and filtering of exemplar data and signature libraries via cognitive analytical and correlation algorithms. The resultant concatenation image is accompanied by a composite probability of detection, improving the detection and matching.

The present invention uses a computational apparatus and methods of handling the flow of information generated by each one of a plurality of input information mechanisms or sensors. The computational apparatus and methods can be located on or occur at the same location as the sensor collection, for example a vehicle, or can be at a remote location that is in active communication with the sensors or vehicle housing the sensors. Thus, both or either of cloud computing and local computing methods and systems are encompassed by the invention and can be used.

The construction of the five stage method for data fusion, detection and presentation roughly follows the Joint Directors of Laboratories (JDL) data fusion process model. (see O. Kessler, et al, *Functional Description of the Data Fusion Process*, Technical Report, Office of Naval Technology, Naval Air Development Center, Warminster, Pa., January 1992; D. L. Hall and R. J. Linn, "Algorithm selection for data fusion systems," *Proceedings of the 1987 Tri-Service Data Fusion Symposium*, APL Johns Hopkins University, Laurel, Md., Vol. 1, pp. 100-110, June 1987). A top-level view of the implementation of the JDL to the present invention is illustrated in FIG. 1. The JDL model is commonly used in the data fusion community and will assist with the understanding of the data fusion approaches, algorithms and systems presented herein. The data fusion process can continuously refine the estimates of data quality and matching parameters and can evaluate the need for additional sensor data. Various algorithms can also be selected and used in the process, including one or more selected from Bayesian Fusion, Distributed Data Fusion, Dempster-Shafer Fusion, Fuzzy Fusion, Random Sets Based Fusion, Voting, and Dezert-Smarandache Fusion, for example (see Smarandache and Dezert, "Advances and Applications of DSmT for Information Fusion," vol. 2, American Research Press, 2006).

One embodiment of the inventive method and apparatus provides improvements over existing, single sensor event detection systems by autonomously combining heterogeneous sensor outputs/data and using cognitive analytics to automatically carry out the following capabilities: detection and matching of desired targets in dense and rapidly moving target environments; correlation of co-dependent sensor observations; higher performance in the presence of background clutter; improved context-based reasoning; integration of identity and kinematic data; true fusion of image and non-image data (at the data level); target object detection and matching to exemplar library; mission constraints applications (scoping); and automated directed sensor management. In addition, the present invention provides a creative graphical user interface (GUI) to support advanced geospatial and visualized presentation of fused data to operators and to provide mitigation of known cognitive biases and illusions.

One example of the increase in detection (Pd) for the Wind Energy sector uses the present invention to detect blade defects such as indications of lightning strikes, blade edge erosion, structural failure of the blade or the presence of fouling and lubrication leaks. The data collection includes the fusion of data from three sensors, daylight high resolution optical images, infrared images and millimeter wave radio frequency images. The system is trained using matches to the exemplar library, each independent evaluation of the modal data produces a probability that the impairment or defect is a certain classification. (lightning strike, erosion, structural etc.) The second sensor, infrared, provides images that can be used to see structural voids in the blade structures, cool/hot spots where water has created thermal contrast. The third sensor millimeter wave provides an image that exposes internal water pockets. The present invention identifies and classifies the image content based on comparison to exemplars for each sensor modality. The union of the data sets will improve detection (Pd) of wind turbine blade defects and allow maintenance personnel be provided with actionable data by fusing the visible spectrum with image data from the invisible spectrum.

The invention can rely heavily on image analysis in one embodiment and thus many algorithms can be selected and used to optimize the data encompassing images. In a first implementation, an algorithm uses edge detection based on the Sobel operator or Sobel filter known in the art. It is a discrete differentiation operator, computing an approximation of the gradient of the image intensity function. At each point in the image, the result of the Sobel operator is either the corresponding gradient vector or the norm of this vector. During the simulation tests with other operators, such as the Robert operator, Prewitt operator, Kirsch operator, and Marr operator, the Sobel operator presented the best performance, especially for detection of inclined cracks in a wind turbine blades.

A second selected algorithm is a non-parametric filter based on Bayes algorithm, the Particle Filter, such as discussed in Thrun 2006, or k-nearest neighbor (k-NN) version of the Bayes algorithm. The particle filter seeks to relate the probability of an image segment to be characterized or not by a crack, based on pixel intensity and on the number of pixels in its neighborhood. The Particle Filter algorithm proposed in Furtado 2012, which was conceived to the detection of underwater cracks, was adapted to enable the automatic conversion of code without changing its fundamental characteristics. See Fabio Celestino Pereira, Carlos Eduardo Pereira, "Embedded image processing systems for automatic recognition of cracks using UAVs," IFAC-PapersOnLine 48 (10) (2015) 16-21.

A second example of the increase in detection (Pd) and the decrease in false alarms (Pfa) using the present invention is in the following. In an industry, such as power transmission and powerline maintenance, the benefit of preventive maintenance is self-evident. Using the present invention to inspect power transmission lines for power leaks, the system can detect leaks using two types of vehicle based sensors and real time analytics and exemplars, the first being infrared, the second being corona discharge detection. The Pd for detecting thermal heating with infrared can detect heating of the insulator in question but it is not alone conclusive. The addition of a second sensor detecting conditions of coronal discharge in addition to the thermal condition of the insulator indicates a power leak and that the insulator is the item needing replacement. Thus, the Pd is high and the Pfa is low for this scenario. This is one case among hundreds of possible failure categories for power transmission. The apparatus of the invention is able to detect degraded equipment conditions by reviewing image and discrete data reported from a number of sensors in order to detect and match maintenance conditions with a high probability using knowledge based automated analysis of cause and effect. Automated early detection prior to catastrophic failure provides significant economic benefit at a lower cost per kilometer of survey than time and resource consuming conventional methods used presently.

A third example of the increase in detection (Pd) and the decrease in false alarm (Pfa) using the present invention is in the following. For forestry management, pest infestations are the cause of great economic loss and environmental impact. The forest service must survey large areas of property and often deploy human inspectors to determine location and extent of infestation by undesirable insects and disease. Sensor data fusion provided by this invention will combine geo-registered image data from multiple sensors, collected automatically identified using contextual analysis and exemplars. Prior approaches using photogramography have been employed to find areas where vegetation is diseased or destroyed by having human and laboratory analysis of such areas at great expense. The present invention can be employed using vehicle-based sensors, for example a first sensor being video analysis, and a second being hyper-spectral sensors and analysis. The video analysis identifies the location of suspect vegetation infestation and disease condition and the hyper-spectral sensor can determine the type of vegetation. The invention, applying analytics and exemplars, can also detect the presence and type of disease or insect species causing defoliation or decline. The present invention is able to detect degraded vegetation conditions by reviewing image and discrete data reported from a number of sensors to detect disease and infestation conditions with high probability using knowledge based automated analysis of cause and effect. Once again the combination of several sensing technologies fused together provide the benefit of higher probability of detection (Pd) and a lower probability of false alarm (Pfa) at a greatly reduced cost per square kilometer of forested area compared with the current survey approaches.

Other examples for deployment of this invention and of the value of the output include, but are not limited to: oil and gas pipeline management, where use of the invention, data fusion and reporting result in recognition of leaks; intentional breaches for theft of products for both maintenance and security; agriculture soil moisture level detection fused with geo-location, which provides automatic guidance for mechanized water delivery; forestry surveillance can provide analysis through kinematics to show users the spread of wildfires resulting in more effective targeted fire response; also in forestry, more accurate detection allows pine beetle and other pest detection, resulting in more effective and targeted delivery of insecticides; automated power transmission line inspection detects coronal outputs, identifies sagging or broken wires, vegetation encroachment, resistive connection faults and other faults allowing preventative maintenance; ocean oil/gas platforms can benefit from iceberg location and drift detection; geologic survey using the invention automatically identifies specific geo-resources; environmental protection in detecting oil and chemical spills; and general mapping and product damage estimation.

The paragraphs above referred to the five stage method for data fusion, detection and presentation of the data to an operator roughly following the Joint Directors of Laboratories (JDL) platform. The invention discussed herein is structured according to JDL in this embodiment of the present invention, in stage one intelligent agents comprised of Data Fusion Services (35) analytical services residing in a computer analyze all pixel-based sensor data from each separate sensor in order to generate metadata describing the parts of a visual scene, and then store that information in a metadata index for a particular sensor. For example, a given configuration might have both an EO camera and an IR camera. In this embodiment of the present invention, each individual set of sensor data is individually analyzed and stored separately in an index. The index describes all the foreground and background objects found in a scene, dynamically generates tags or keywords describing that scene, and provides a confidence level associated with the identification of a given object. The algorithms used to generate this metadata include those available that provide segmentation, edge detection, light detection, shadow detection, color and texture detection, and others, such as the algorithms listed above or referred to in the cited published articles. Metadata outputs include coded identification and tagging or key wording of objects in the scene, provision of the x, y coordinate and height and width information for the starting and ending point of a boundary box around each identified object, as well as other significant metadata information.

In stage two intelligent agents comprised of Data Fusion Services (35) fusion services make use of industry specific libraries (1) of exemplar information to perform specific object matching for a given sensor. "Intelligent Agents" refers to a program written and included as an operational subcomponent of the invention, run on a computer that gathers information or performs some other service without immediate human intervention and on some regular schedule. For example, one can use this approach to find a specific make and model of a minivan or a specific cargo ship. Exemplar libraries of objects are compared with incoming new sensor [Target] data from each individual sensor employed. When an exemplar matches an incoming target data object, that object is tagged with new information (e.g. Dodge minivan) and that metadata information is added to the index. In addition to exemplar libraries, ground truth indexes are created by the system user or an external source, such as, the ONR database of spectral signatures (1), which have specific examples of sensor images of interest with metadata tags already applied. When new data from sensor attached to the present invention is streamed into the system, the new data is indexed by comparison to the ground truth indexes and metadata tags (or keywords) are automatically applied to the new data. Note that exemplar libraries are organized by each different sensor modality. That is, EO provides a library of exemplars, IR has its own library of exemplars, etc.

In stage three intelligent agents comprised of Data Fusion Services (35) fusion services collect and collate the information analyzed for each independent sensor for a given collection. Kinematics are employed to rank the quality of each sensor based upon a "best to worst" standard in order to calculate the best object detection results for all sensors. The kinematic selection process produces results by calculating a "Quality Factor" for each sensor modality for each image, frame of video or quanta of pixels being analyzed. This aids in numerically selecting the "most likely" detections across different modalities. For example, in some cases an EO camera might give superior results, an IR camera might give medium quality results, and a SAR sensor might provide little or no relevant results. In order to qualitatively balance the resulting data from a given sensor, each sensor will have a sensor quality ranking value "QF" (quality factor) associated with it, which is used to help weigh the ranking of each sensor and its analyzed output. This process is repeated for each sensor modality and each sensor detection and stored in the database lookup table by detection classification, time stamp and Geolocation and other database keys. Once collected, the ranked list of sensor metadata for a cross-modality metadata collection is stored as an Object Detection Vector (ODV) in an object detection vector database. Note that the invention relies upon measurements made by filtering against ODV information.

In stage four each sensor contained in an ODV is then precisely geo-spatially normalized over time. The results are organized as a fused n-dimensional geospatial database of "Object Detection Events" (ODE) including all associated event based metadata presented by each sensor. The post-processed ODE streams of data from each sensor are processed further by intelligent agents comprised of Data Fusion Services (35) fusion services and associated detection events are correlated using all relevant and available sensors. With this type of approach, the detection of a specific object by a single sensor can be confidently confirmed by correlation of a detection of the same object by a secondary sensor or set of sensors. Intelligent agents assemble the correlated, time stamped and geo-registered ODEs across all the types of sensors used to form a fused detection event (FDE) data set, which is stored in an event detection database. In FIG. 8, the FDE is depicted at the end of the computer-controlled processes, showing the identification of a "Target" as a Fused Image Target Detection, which is a FDE using the image as shown in this example.

In stage five if correlation and event identification is not yet confirmed after stage four, FDEs in the event detection database may be optionally or automatically selected for enhanced data fusion to better identify detection events through pixel and pantone sharpening fusion, correlated and analyzed by intelligent agents comprised of Data Fusion Services (35) fusion services using vector space projection techniques, neural nets and fuzzy logic. The results of stage five analyses allow the invention to provide reliable, precise decision support by cognitively recognizing fused information across the sensors used. This is done in order to automatically provide cross sensor modality detections having high correlation, low false positive rates, and thus providing an increased probability of detection of objects of interest to the human in the loop for enhanced decision support.

Thus, the present invention provides meaningful data results to be used for many decision support purposes for a given commercial concern, vertical industry or government agency having a need for concise, high probability detection of pixel based objects, object correlation and events from a plurality of sensor modalities. A standardized user interface will geospatially visualize generated decision support information and enable automatic reporting of FDEs without human intervention.

Pixel registration is used to align geo-locational tags in video and image data. The present invention uses spatial transformations to fit the image data to a common coordinate system (e.g., projection to an earth reference model or three-dimensional space). The non-imaging data are spatially referenced, not to a point in the image, but to a region with a specified uncertainty, from which the detected discrete event occurred.

In another embodiment of the invention, the apparatus includes a high performance supercomputing (HPC) system, FIG. 2, and as designed can provide 7 to 10 or more teraflops of computational capability in a portable, ruggedized, suitcase package for use aboard ISR aircraft or other fixed or mobile ISR platforms. The system is designed as a tightly integrated embedded computational hardware and software platform, designed to employ the latest generation Intel or Intel compatible processors, the latest generation multivendor general purpose graphical processing unit (GPGPU) co-processor board offerings, the latest generation co-processor card electrical bus interface including but not limited to PCIe and/or other similar interfaces, with support for field programmable gate arrays (FPGA). The system will carry a minimum of 64 Gb of random access memory (RAM) and will support a minimum of 6 Tb of static memory (SSD) network accessible direct access storage devices (DASD), plus 64 Gb or more of system cache memory. The system will support multiple high speed networking interfaces including fiber optic connections for 1 Gb Ethernet, support for Infiniband fabric switching and connections, at least 4 USB v3 interfaces, and the latest N generation WiFi interfaces. The system supports an internal inertial measurement unit (IMU). The HPC apparatus is designed to have every component kept near or at room temperature with liquid cooled and/or through metal conductive cooling. The cooling interface connects to a liquid or air heat exchanger. The system is supported by an onboard uninterruptible power supply. In order to support all the different software processes, the system hardware will be virtualized using a real-time virtualization manager so that multiple guest processes using different operating systems can be managed on a single hardware platform in near real-time with high reliability.

Thus, in one aspect, the invention includes a portable sensor fusion apparatus for the simultaneous analysis of multiple and different data inputs from multiple and different sensors. The sensors detect at least one user defined image. The apparatus further includes a data receiving subsystem consisting of an Ethernet switch (19) and an Ethernet router (18) and an HPC processor (12) capable of receiving streaming inputs from a multiplicity of sensors, and a subsystem consisting of an HPC processor (12) and COTS driver interfaces (35) capable of receiving indexing and storing (15, 36) the incoming sensor data and the associated geo-location information (13) for where the data was collected. The apparatus also includes a data library subsystem (15) for storing exemplars and signatures for each of the types of sensor data used using the system services (36), these sensor data include images for objects of interest, spectral radiance from locations of interest, and images of background objects. A processing subsystem (12) detects objects using COTS software (e.g. OpenCV, Exelis VIS or other image software) in an image received from a sensor, and then matches an object of interest from the data library (e.g. USGS http://speclab.cr.usgs.gov/spectral-lib.html or libraries generated by custom tagging of objects of interest as exemplars). This subsystem is capable of estimating a match probability value based on COTS software calculated percentage pixel or data match with the exemplar data contained in the reference libraries for each individual sensor data, video or images against the exemplars and signatures stored in the data reference libraries. The processing subsystem is further capable of assigning a quality factor value for specific images and sensor data received from two or more of the streaming inputs simultaneously, where the quality factor value used to determine a new normalized probability value for matching specific images or data received. The quality factor is assigned to each data set collected from each sensor and is based upon the reliability and performance of the sensor in comparison to the other sensors used. The apparatus further includes an intelligent agents (6, 36) which operate on the indexed contained in the database (e.g. SQL or other relational database) (6) of stored data to correlate detection events with geo spatial information combined with probability of detection, sensor input quality factor and environmental factors to fuse the results of said analysis. The results are transmitted to a graphical user interface to display an image along with the detection events and geolocation associated with it. In one example, the apparatus receives by connection a high performance digital image camera as one sensor and an infrared camera as a second sensor. As noted herein, the apparatus typically employs a liquid cooled, high performance computer where the processed data are stored and accessed. In another aspect, the invention includes a method of creating a composite of input images to form a fused image data set. The method employs providing a sensor fusion apparatus for the simultaneous analysis of multiple and different data inputs from multiple and different sensors, the sensors detecting at least one user defined image, the apparatus containing a library of exemplar data. The method further includes selecting a spectral wavelength for detecting an image from one sensor used and selecting a radar input at a frequency consistent with reflectivity in either light foliage or heavy foliage for another sensor used, and then recording an image with visible light, infrared, and radar sensors. The image is geo-registered, and then an image based pixel level detection performance of the first "n" sensor images is made, and the image supplemented with spectral and radar data to create a composite image. Algorithms determine if an equivalent matched image occurred across the sensors used or exists in the library of exemplar data, and the composite fused image with matched data and geo-locations data is displayed.

In the above example method, the composite image could include forestry or agricultural data. Alternatively, the composite image could include border or geographic boundary data. In similar, but non-limiting, examples, the methods and apparatus could be used for: wind turbine inspection, using sensors for electro-optics (EO) and full motion video (FMV) imagery, infrared (IR), in order to detect damage to wind turbine blades or the housing; oil and gas transmission or pipeline inspections (i.e., pipelines, oil rigs, oil sands), using sensors for EO, LIDAR, IR, Hyperspectral, and SAR, in order to find damaged infrastructure or pipes, liquid and/or gas leaks, or to find intentional damage and wear and tear damage; power line inspection (i.e., nuclear, wind, coal-powered), using sensors for EO, IR, LIDAR, in order to find damaged infrastructure, leaking electrical conduits, coronal discharge, damage wires, or other equipment, like poles, insulators, and the like; forest fire support and monitoring for prevention, using sensors for FMV, IR, Hyperspectral/Multispectral, in order to identify dry soil conditions or moisture levels, find hot spots and cool spots in an existing fire, and find people, livestock, wildlife in danger; maritime monitoring and inspection (i.e., fisheries, oceans, coast guard, traffic, pollution, piracy), using sensors for EO, FMV, IR, SAR, Hyper/Multispectral, in order to identify ships, pollution or floating obstacles, vessels, islands and land masses, wildlife, and lost people in the water; energy and mining monitoring (i.e., geology, monitoring), using sensors for FMV, EO, IR, SAR, Hyperspectral/Multispectral, in order to identify resources, mining activities, strip mining violations, pollution; natural resources monitoring or detection (i.e., forestry, air, water quality, natural gas leaks), using sensors for IR, EO, Ultraviolet, Hyperspectral, in order to identify a variety of conditions and problems that may exist with the natural resources (i.e., forestry inspection for pests, oil spills and water pollution, fracking leaks, leaks of natural gas or propane in urban and city areas, old pipe damage or damage to infrastructure); defense and security monitoring (i.e., boarder protection, search and rescue, patrol, antiterrorism, poaching monitoring), using EO, FMV, IR, Hyperspectral/Multispectral, SAR; and police-related monitoring, such as crowd observation, search operations, and boarder observations; event security monitoring (non-invasive monitoring of stadiums), using EO, FMV, IR, primary observational security, in order to look for specific activity, actions, or persons; precision agriculture (i.e., crop monitoring, disease or weed control, hydration or moisture levels) using sensors for EO, IR, Hyperspectral and Multispectral; pin-point agricultural spraying of fertilizer, herbicides, insecticides, habitat monitoring for endangered species, moisture level monitoring; mapping (terrain, urban, elevation), using LIDAR and EO; critical infrastructure monitoring, using EO, IR, SAR, Hyper/Multi Spectral, LIDAR, in order to monitor the watershed, cargo movements, dams and bridges, roadways, and for asset management (at the state level), asset monitoring, and transportation monitoring.

In another aspect, the invention includes a method of creating a composite of input images to form a fused image data set by providing a sensor fusion apparatus for the simultaneous analysis of multiple and different data inputs from multiple and different sensors. The sensors can detect at least one user defined image and the apparatus can contain a library of exemplar data to compare elements of an image received from the sensor. In one example, a sensor for detecting coronal discharges is used and an infrared sensor is used, consistent with powerline transmission monitoring. The apparatus records an image from the sensors, geo-registers the image with metadata on location, performs an image based pixel level detection of the first through "n" optical sensor images and further supplements the image data with spectral and coronal discharge data to create a composite image. The method and apparatus then determines if an equivalent, matched image occurred across the sensors being used at the same time or matches an image from a library of exemplar data, further supplementing the image data with matched images to form a fused, composite image, and then displays the composite image. In this example, the exemplar data would include images of powerline locations of interest.

BRIEF DESCRIPTION OF THE DRAWINGS

FIG. 4 is a diagram of the data fusion and analysis service oriented architecture (SOA) showing an example block diagram for this embodiment of the data fusion and system services supporting the software architecture which may be realized on the portable apparatus described herein or remotely in a virtual cloud based environment where sensor data is uploaded to the cloud for non-real time processing.

DETAILED DESCRIPTION

Figure 1:
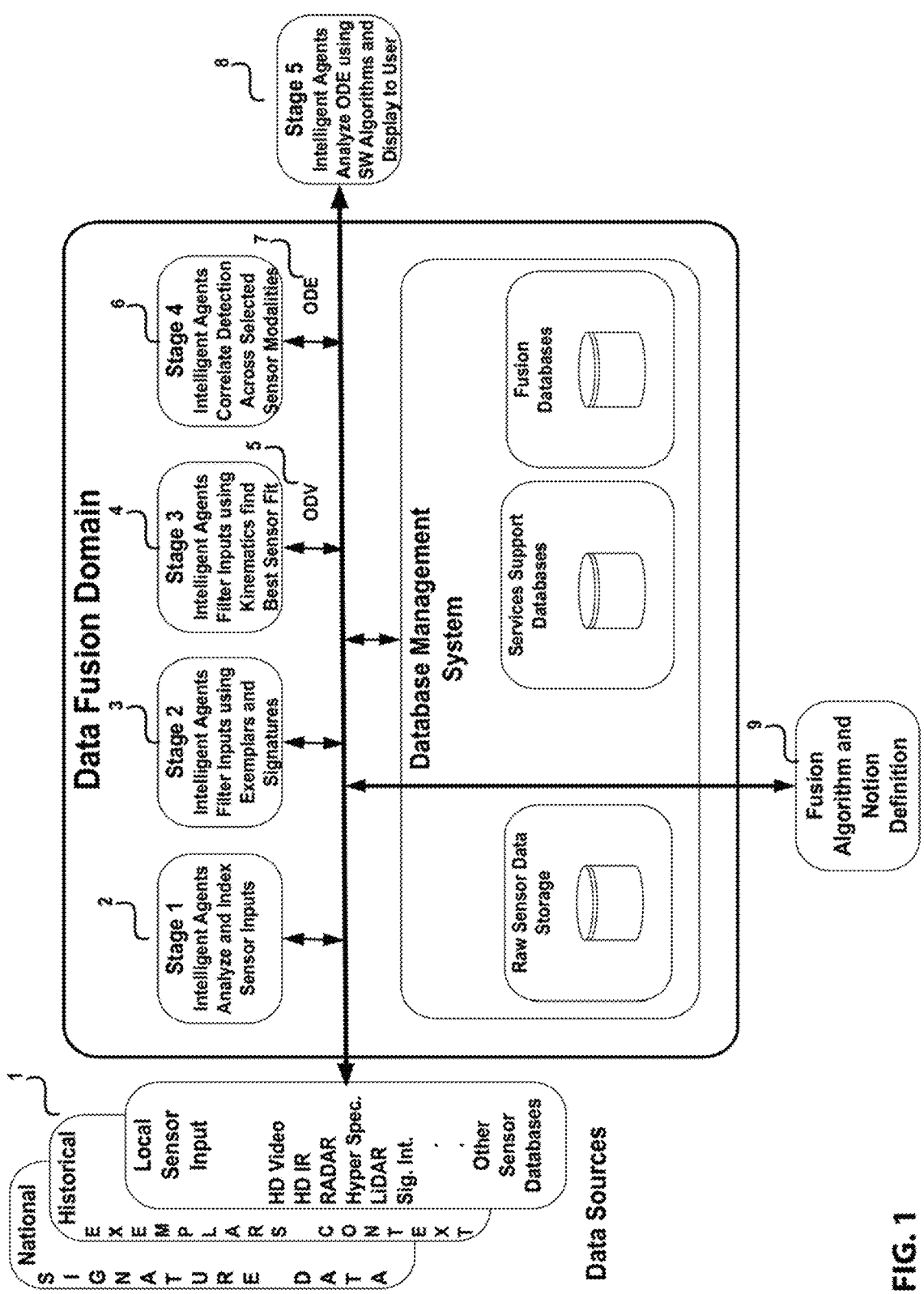
FIG. 1 is an overview of the sensor data fusion method showing a block diagram of the novel method for gathering inputs from disparate data sources, applying intelligent agents to pre-condition the data, applying algorithmic analysis, and correlating results from object detection events across modalities. At each stage analysis results are stored in a database.

Sensors of various capabilities and modalities are available from a multiplicity of vendors. These sensors may be mounted and configured for use on a multiplicity of vehicles depending on the sensing mission. The pixel and image processing software associated with analyzing and visualizing the output data from these sensors is provided as an in-situ component of the sensors or on an adjunct processing system. The output of the embedded processing in the sensor systems is used as input to the present invention. In many instances, this information includes complex image data containing information that characterizes visual context and in some cases geometry of the terrain over which the vehicle is traveling or that a stationary platform is observing. In this regard, for example, a multi-sensor payload can have a multiplicity of the object image contexts and image matching geometry information input from different mode sensor sources. The image context and geometry information for each particular sensor information source modality defines a respective raw data set on which the present invention applies both context and analytic analysis. The input data shares geo-spatial overlaps that have longitude and latitude geo-reference coordinates in common among them (i.e., a geographic coordinate system). They also have a common view which contains image context that overlaps. One objective of the embodiments of the invention is to individually analyze the input sensor context information from different sensing modality sources of the same subject matter scene. The identification of context in each sensor modality is indexed and the data is compared and matched to exemplars of known objects compared, filtered and then fused both pre and post processing based on geo-spatial reference coordinates. The present invention normalizes the visual pixel or image information from multiple sources so that all gathered data are stored or left in industry standard formats. For example, content-specific metadata and data documentation can be expressed or noted within a given data format in terms of community based content standards (such as ISO 19115, FGDC, SensorML, and UncertML) and other available community-built ontologies. This information is useful not only for sharing and comparing by subsequent data users, but also for purposes of replicative compilation or computation to prove or extend the CDE data set of the invention, and also for extension of serial or time series collections within a data set. In addition, it can be useful to know the form of expression for the metadata and documentation, i.e., whether it is expressed in a well-known XML schema or RDF ontology, as CSV spreadsheets, relational database tables and attributes and included with the data, or as links to external reports, ontologies or web-based services. Software products compliant with OGC standards are referred to in the OGC Product Registry.

In view of the disclosure here, a skilled person will appreciate that disparate information sources or sensors in the context of the invention are not limited to radar, electro-optical, or spectral systems, but can also include information from historical data sources or from historical libraries of data (e.g. exemplar image data, radar and spectral signature data).

As used in this document, "data fusion" refers to combining/integrating pixel data from multiple different visual sensor sources and also overlaying text data from multiple sources correlated across the same field of view (e.g. daylight image integrated with infrared and/or RADAR imagery overlaid on geospatial map data showing locations of objects/events of interest). An "EO-Sensor" (EO) can capture still images and full motion video color or monochrome content standard definition (SD), high definition (HD) and others. "IR-Sensor" can capture short-wave, medium wave and long-wave infrared still images and full motion video, and may employ false color visualization approaches. "Synthetic Aperture Radar (SAR)" sensor render images based on reconstruction of radar returns specific to the type, performance and frequency specific to the radar technology. "Multi-Spectral" sensor render images based on light frequency (colors) reflected off the surface of objects. Multi-Spectral imagers have wider band characteristics thus less spectral (typically 4-16 bands) resolution compared with Hyper-Spectral (typically 400-600 bands) imaging sensors. "Hyper-Spectral" sensors render high granularity images based on narrow bands of light (typically 400-600). See Multi-Spectral. "SIGINT" refers to signals intelligence, an approach to collect signaling via radio, microwave, and other transmission sources to capture radio, TV, cell phone, satellite and other signals. "Geo-Spatial" refers to coverage based on GEO (earth) locations. This references a methodology to inform people of latitude and longitude information so as to associate data with information about where something is collected or referenced on the earth. Information is typically shown plotted on a map. "Geo-Registered" refers to data that is meta tagged with precise longitude and latitude of a geo-Location correlated to a known registration location on the ground. See Geo-Spatial. "Target" refers to an image or segment or discrete data that has significance to the operator or image data user. For example, a specific vegetation type, specific elevation, specific soil moisture level, or combination of all these when considering agricultural monitoring embodiments. "Probability of Detection (Pd)" refers to a statistical calculation measuring the likelihood of a positive detection. The probability of detection (Pd) is the probability of saying that "1" is true given that event "1" occurred. "Probability of False Alarm (Pfa)" refers to a statistical calculation measuring the likelihood of a false positive detection. The probability of false alarm (Pfa) is the probability of saying that "1" is true given that the "0" event occurred. "Meta data" refers to data about data, or data that is added to and describes or further defines other data. Specifically, this is data generated by a system that relates to an image or discrete data collected by a sensor that is associated with the specific image or discrete information as collection (data acquisition) takes place or is added as a post collection process. The result being all data is available as a record in the database which has multiple keys for later search, retrieval and reconstruction. "Pixel Registration" is a process of mapping and normalizing disparate image data based on a common reference point. For example, correlating image data based on pixel mapping and discrete data mapping to geo-registered longitude and latitude locational information. "Sensor Modality" or simply "Sensor" is a device that collects data for use in the apparatus and methods using different electromagnetic and light spectrums, for example. Each of daylight, video, radar, spectral technologies are all fundamentally different ways in which to look at the same scene and draw different information or data from that scene or discrete image data. "Orthogonal Rectification" refers to geospatial science method. It is a process of reinterpreting data by calculating and adjusting data as if it were taken at a 90 degree angle from the surface of the earth. "Quality Factor (QF or qf)" refers to a qualitative or quantitative factor which provides a comparative and uniform index of like-featured products or technologies, and rates them based on performance to a common algorithm or parametric test criteria. "Object Detection Vector (ODV)" refers to pattern recognition methods and machine learning. An ODV (feature vector) can be n-dimensional vector of numerical features that represent some object or image element. Feature vectors are equivalent to the vectors of explanatory variables used in statistical procedures, such as linear regression. "Vector" refers to a quantity having direction as well as magnitude, especially as determining the position of one point in space relative to another. "Kinematics" refers to methods and procedures dealing with the motion of objects (and measurement of that motion) without reference to the forces that cause the motion. "Quality Factor (OF)" relates to ODVs (feature vectors) and are often combined with weighting values using a dot product or scalar approach, in order to construct a linear predictor function that is used to determine a score for making a prediction. A QF is a weight or score used in making a prediction. "Event" refers to a result of an analysis of data that directly correlates to a desired detection. For example, a system is looking for power transmission transformers that are thermally in range within those known to be associated with a degraded state. Thus, a high temperature detection means pending failure due to hydrogen gas build up from oil breakdown. "Object Detection Event" (ODE)" refers to feature construction forming ODE. "Intelligent Agents" refers to a program run on a computer that gathers information or performs some other service without immediate human intervention and on some regular schedule. Running small snippets of code, it can make pre-defined decisions based on new data and execute additional operations in an automated fashion. Feature construction is the application of a set of constructive operators (intelligent agents) to a set of existing features, resulting in the construction of detections that constitute and event. Constructive operators can include checking for the equality conditions {=, ≠}, the arithmetic operators {+,−,×,/}, the array operators {max(S), min(S), average(S)}, as well as other more sophisticated operators (Intelligent Agents), for example count(S,C)[3] that counts the number of features in the feature vector S satisfying some condition C, or, for example, distances to other recognition classes generalized by some accepting device. "Automatic Target Recognition (ATR)" is the ability for an algorithm or device to recognize targets or objects based on data obtained from sensors. "Registration" (or alignment) is the process that places all sensor data in a common time and space coordinate system. This corrects for the different time sampling, viewing perspective, and image planes of different sensors used. "Detection" or matching is the automated decision regarding the presence or absence of an entity or element in an image (e.g. target or aggregate of targets) or an event (e.g., missile launch or fire) that may be based upon the evaluation of multiple individual sensor decisions, or it may be based upon the combination of raw data from multiple sensors. "Correlation and Association" are processes of data fusion which partitions data into associated categories (also referred to as labeling) and can include correlation and association stages. "Combination" is the process of combining data from all sensors to derive a refined estimate of the state and identity and is capable of managing the uncertainty in sensor measurements, and providing estimates with associated measures of estimate uncertainty (Pd and Pfa). Fused Detection Event (FDE) are the result of upstream processing of data at the source. The present invention allows for sensor data to be collected, analyzed and fused at the point of detection as opposed to individual streaming data being sent to ground for analyst review. The transmission of FDEs results in image data compression at the source of the data without a human in the loop. The combination of image data reduction (less bandwidth required) and high probability of detection (Pd) is highly desirable, cost effective and unique to the present invention.

While not limiting the invention to any particular embodiment here or in the Figures, the following description details exemplary methods, apparatus, and systems of the invention. As explained in FIG. 1 Sensor Data Fusion Method, the invention encompasses (1) Data Sources which provide input from government and commercial, national and historical data sources and is combined with the data from local real time sensor inputs and other heterogeneous databases and data sources. This includes data from local and remote sensors accessible to the data fusion system, information from reference systems and human inputs. All processing in each stage is driven by intelligent agents. (2) Stage 1 incorporates intelligent agents that analyze and index incoming sensor data from the individual normalized streams of sensor input (e.g. visual data is analyzed and indexed in the context of photographic/infrared image data, SAR radar data is analyzed and indexed in the context of radar image data, spectral data is analyzed and indexed in the context of spectral image data, other data is analyzed and indexed in the context of the known modality of that sensor either image or discrete data). (3) Stage 2 takes input from stage 1 and operates on the metadata index information analyzing the data by comparing and filtering exemplars and ground truth images against individual incoming sensor content. The results of stage 2 are recorded in a metadata index database for future search and retrieval. (4) Stage 3 takes inputs from stage 2 and operates on the recorded metadata and stored information associated with each set of data from each individual sensor modality. Thus, incoming stage 2 analyses are presented in parallel to the stage 3 processing. Stage 3 reviews and acts on incoming individual sensor data. It develops a description of current relationships among objects and events in the context of each objects visual environment. Intelligent agents apply Kinematic and best fit analyses to the sensor output identifying candidate objects of interest which are then recorded in the index database. In addition to detection, a sensor Quality Factor (QF) FIG. 6 (43) is generated based on a pre-measured rating stored in the system for each sensor type and modality and applied against each image or set of pixel data. Additional quality assessments are calculated at the time of data collection based on the sensing environment for each sensor modality that is active. The system also records an index which represents the probability of detection for each frame. The system attaches QF information to the file data which creates a database record (5) in a specific form defined by the system as the Object Detection Vector (ODV). (6) Stage 4 accepts results from Stage 3 analysis of each of the individual sensor stream ODV information. The ODV information presents to Stage 4 a multiplicity of detections in each individual sensor modality. Based on human input to stage 4 intelligent agents the data is screened for indications in the database across all modes scanning all ODV records and comparing them to desired detection events. When event detections are found based on ODV screening, cross correlation is done across sensing modalities based on Geo Reference data. The system uses an algorithm to declare and event and assesses the quality of the decision by using the QF to rate the quality of a detection in each sensor mode and assuming the detections in each sensor mode of interest for a specific type of detections are triggered the system declares an event. The declaration of an event involves the system rating the detection with a rating high enough to pass operator set or defined thresholds. Thus, the operator and menu of desired objects or elements to detect (9) can also specify the quality of sensor information necessary to declare an event with 95% or higher probability of detection. Object Detection Events (ODE) (7) can be declared as the system correlates the data in near real time. As an ODE is declared it will carry with its data in the database an associated probability of detection. (8) Stage 6 operates at the level of cognitive analytics, the ODE are combined with image analysis of the scene including an understanding of the context of the scene known as a notion to those skilled in the art. The combination of the notion and the ODE are interpreted by intelligent agents are then fused together with the image data and presented to the user through a graphical user interface (GUI). The image and the detection are layered and overlaid on previously generated map or imagery based on their Geo Spatial reference data forming a fusion with layers based on sensor modality, detection event location and reference map or image data which can be presented as scene angular or orthorectified.

Figure 2:
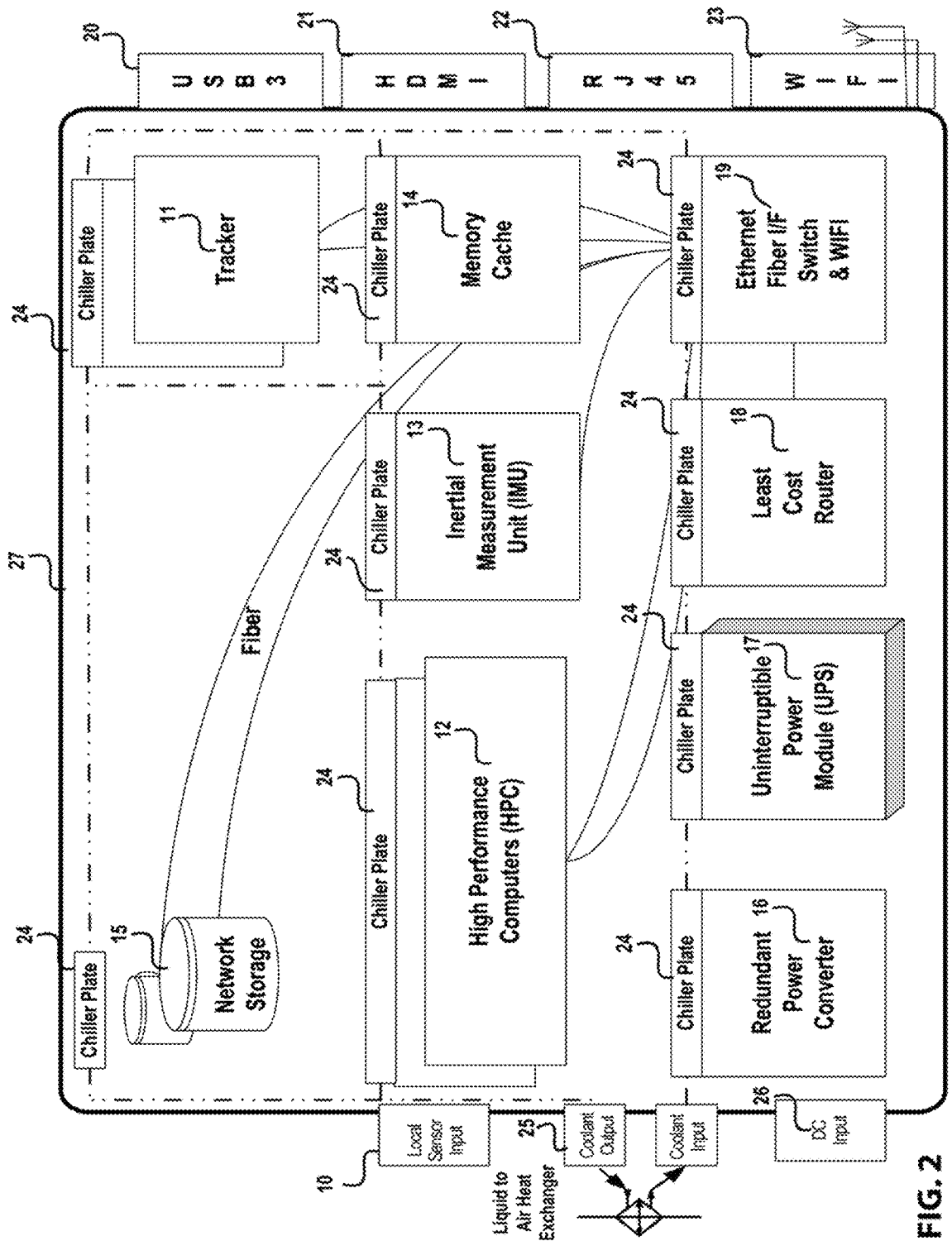
FIG. 2 is a diagram of the sensor data fusion portable apparatus showing a block diagram of portable apparatus associated with the novel application of hardware functional elements that defines an example of the physical and electrical embodiment of hardware to provide the necessary components and thermal management of enabling hardware.

FIG. 2 Sensor Data Fusion Portable Apparatus (27) is a functional diagram of a novel portable apparatus capable of high performance computing, inertial reference, communication, and data storage. The computational platform is capable of near real time acceptance of sensor input (10) and optionally having a small form approximately 10 inches by 12 inches by 24 inches, as described here but not limited to this physical embodiment. The system contains, but is not limited to, cooling system components (24), a software or hardware multi-target tracking subsystem (11), a multi-teraflop GPGPU high performance computer (HPC) (12), a combined GPS andinertial (e.g Northrop Grumman LCR-100) measurement unit (IMU) (13), memory cache (14), local and network storage (15), power converters (16), uninterruptable power supply (UPS) (17), least cost data network router (18), Ethernet switch with optical fiber interfaces (19) within the enclosure (27). The input output connections to external devices connections which include, but are not limited to, universal serial bus version 3 (USB3) (20), high definition media interface (HDMI) (21), RJ45 Ethernet connectors (22), Wi-Fi (25) and liquid cooling ports (25) in addition to native BNC connections included in the sensor input panel (10).

Figure 3:
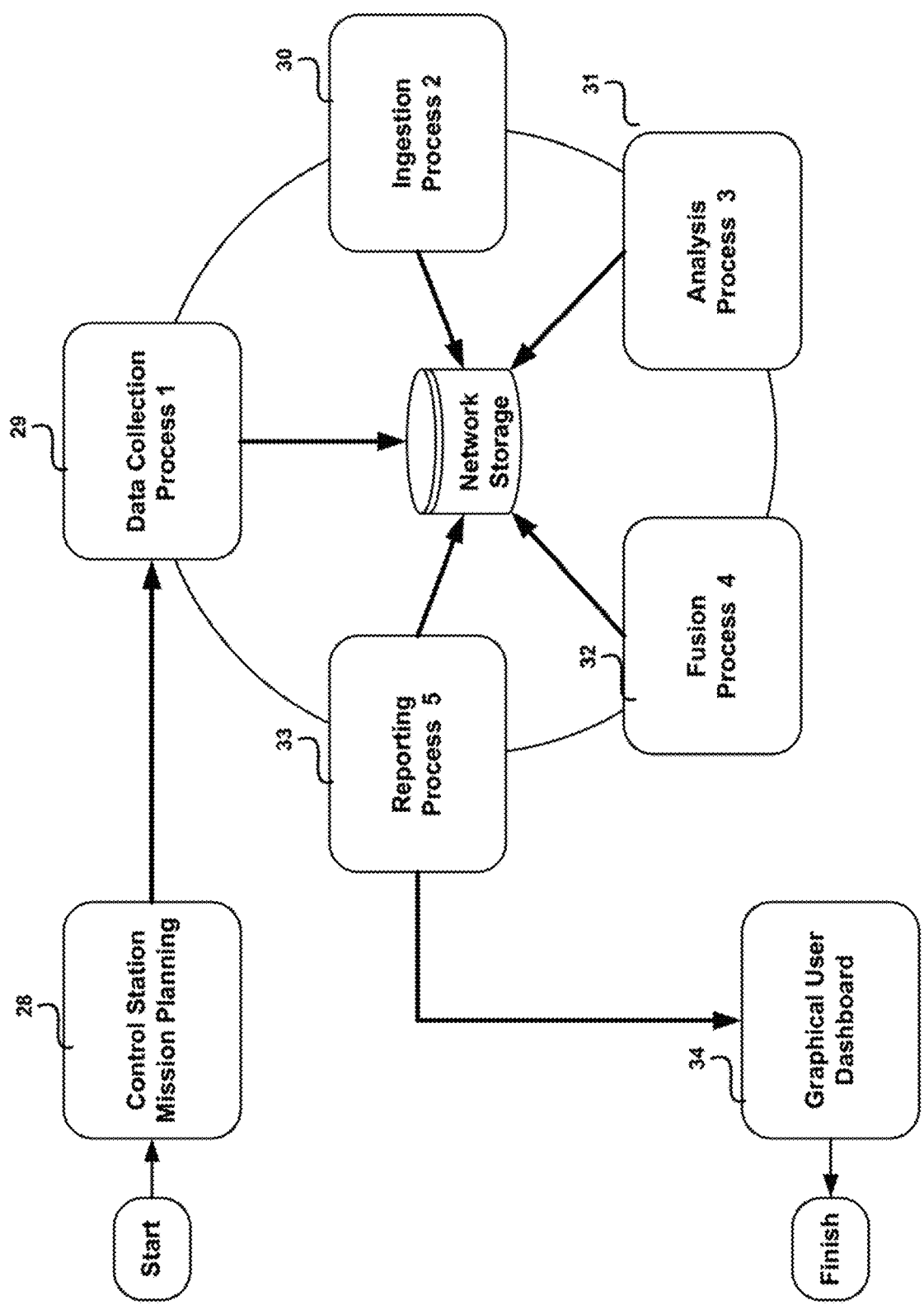
FIG. 3 is a diagram of the decision support software architecture showing an embodiment of a process diagram of the system functionality breaking down the present invention into five (5) stages of process from start to finish.

FIG. 3 Decision Support Software Architecture describes a process view of the steps from input to output for the present invention. Progressing from start, the initialization of the system begins with the input from external and internal application layer software systems supporting storage subsystem setup, exemplar library setup, control station and mission planning subsystems. (28) Process 1 performs the steps necessary when gathering of data during the collection process once the mission commences. (29) Process 2 performs data normalization of incoming data transforming native data formats to a common format for entry into the analysis process. (30) Process 3 performs analysis using intelligent agents and algorithms to interpret the incoming data create both ODV and ODE information and store the results in the database. (31) Process 4 performs fusion of Geo-Registered ODE data with visualization images produced by sensor subsystems from sensor inputs, stored Geo-map information, and elevation data. (32) Process 5 performs reporting of detections derived from the fused data. The output reports are user defined during the planning phase (28) to output answers to user questions based on detections present in the fused results of processes 1 through 4. The result (33) of reporting processes are presented to the user through a web enabled graphical user interface (34) dashboard displaying the results of the analysis displaying statistical information, text and graphic products viewable locally as well as remotely to users. The raw and fused data is stored and available for subsequent searches and query to inform a multiplicity of users of answers to questions unspecified or unanticipated at the time of data collection. At finish, the complete record of the data collection and the fusion results are exported to storage, either in fixed storage or cloud-based for future reference. When data from multiple missions are available, both real time and temporal mission query data and graphical displays are available for user search and inspection.

FIG. 4 Data Fusion and Analysis Service Oriented Architecture presents an overview of one embodiment of the invention's system service oriented architecture. Presented here to represent two, but not limited to two, groupings of services including Data Fusion Services (35) and System Services (36) whereas such services can be expanded or contracted to match the scope of data fusion requirements. The examples are shown in this embodiment, but are not limited to those shown, are based on the scope of data fusion requirements and the decision support requirements for integration with software components that exist or are available in the art. The service components comprising the both Data Fusion Services and System Services will be made available to intelligent agents described above in FIG. 1 elements (1), (2), (3), (4) through local system instance or virtual machine hypervisor instantiation.

Figure 5A:
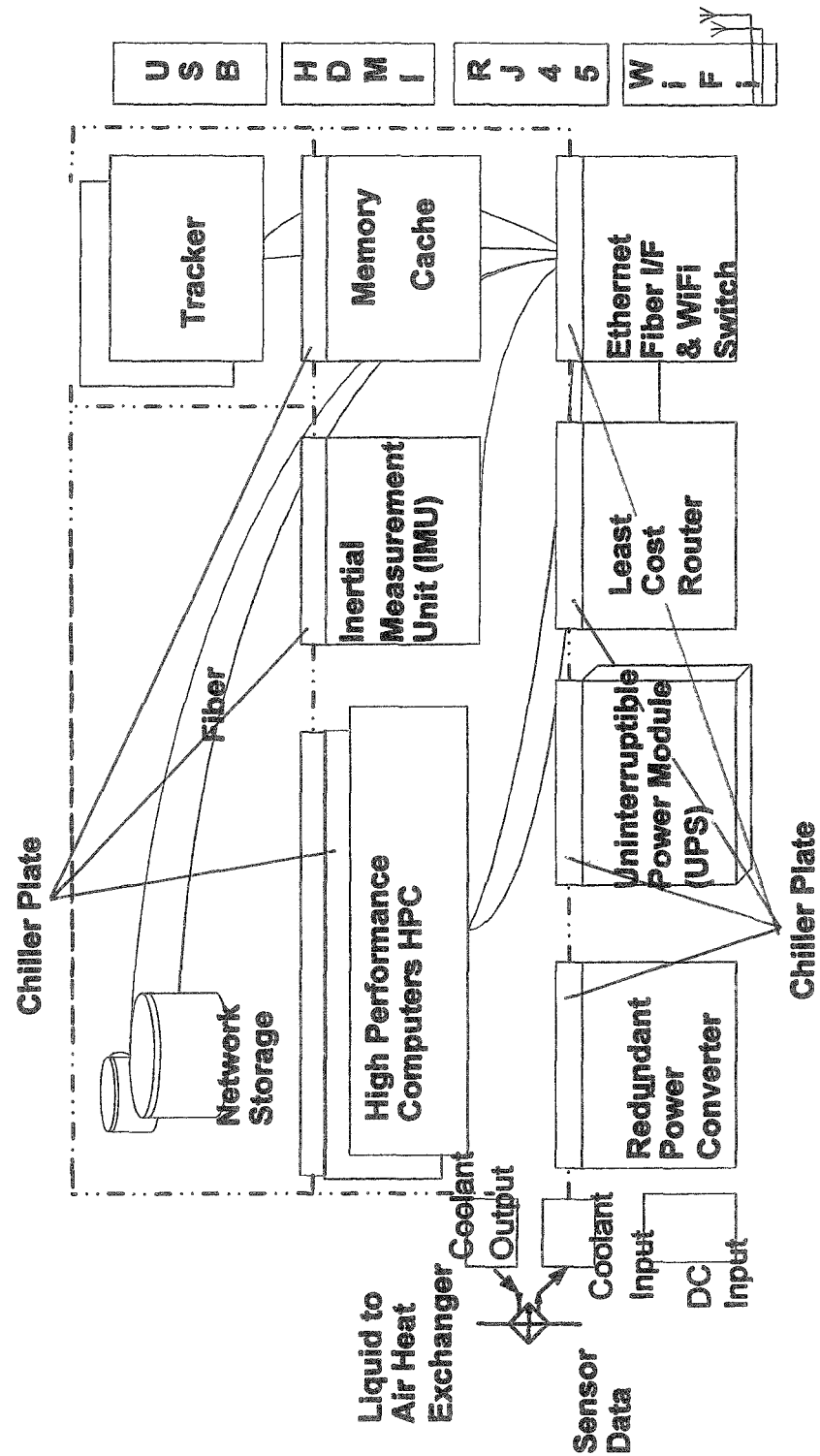
FIG. 5A is a diagram of an aerial embodiment of the portable fusion apparatus showing an example of a generic air vehicle (FIG. 5B) transporting the apparatus and a notional diagram of a sample data collection (FIG. 5C).
Figure 5B:
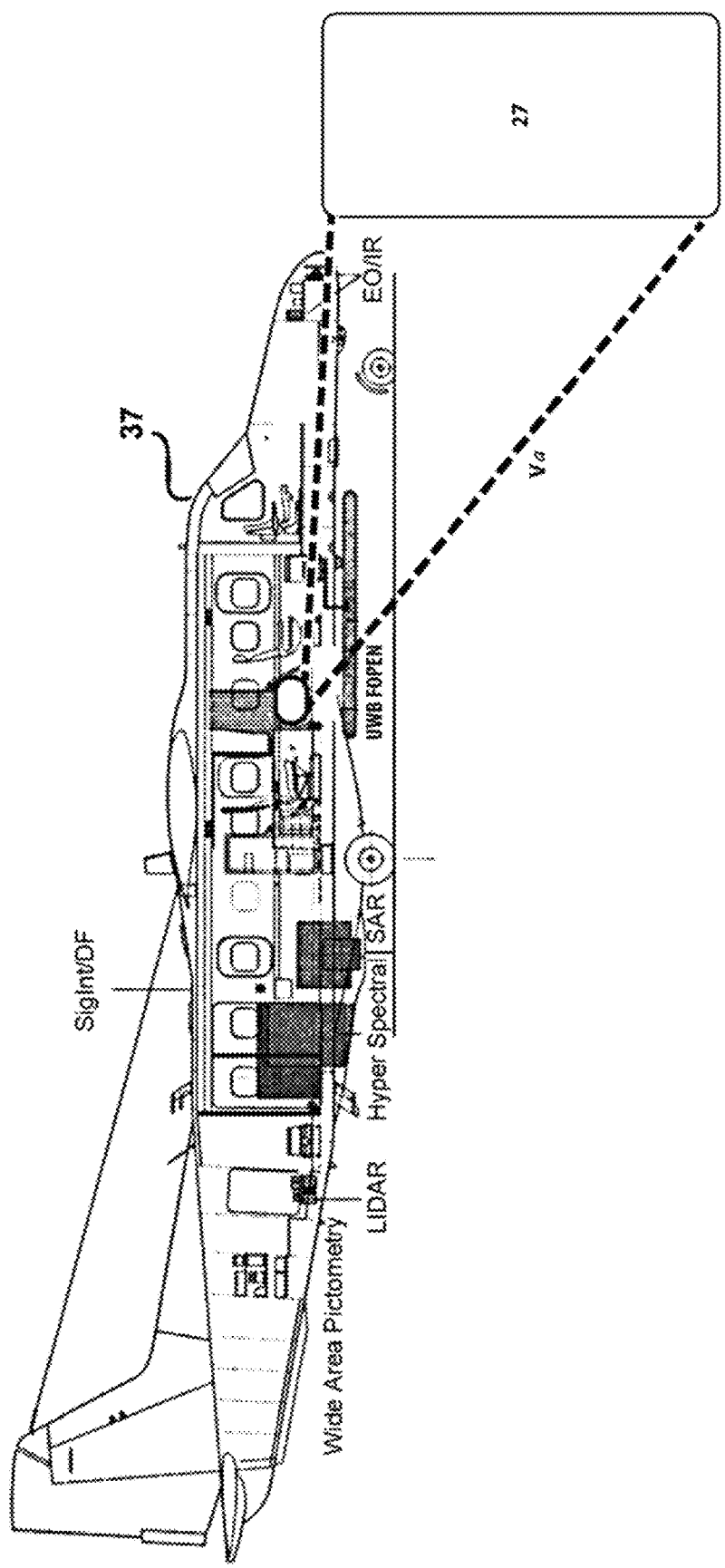
Figure 5C:
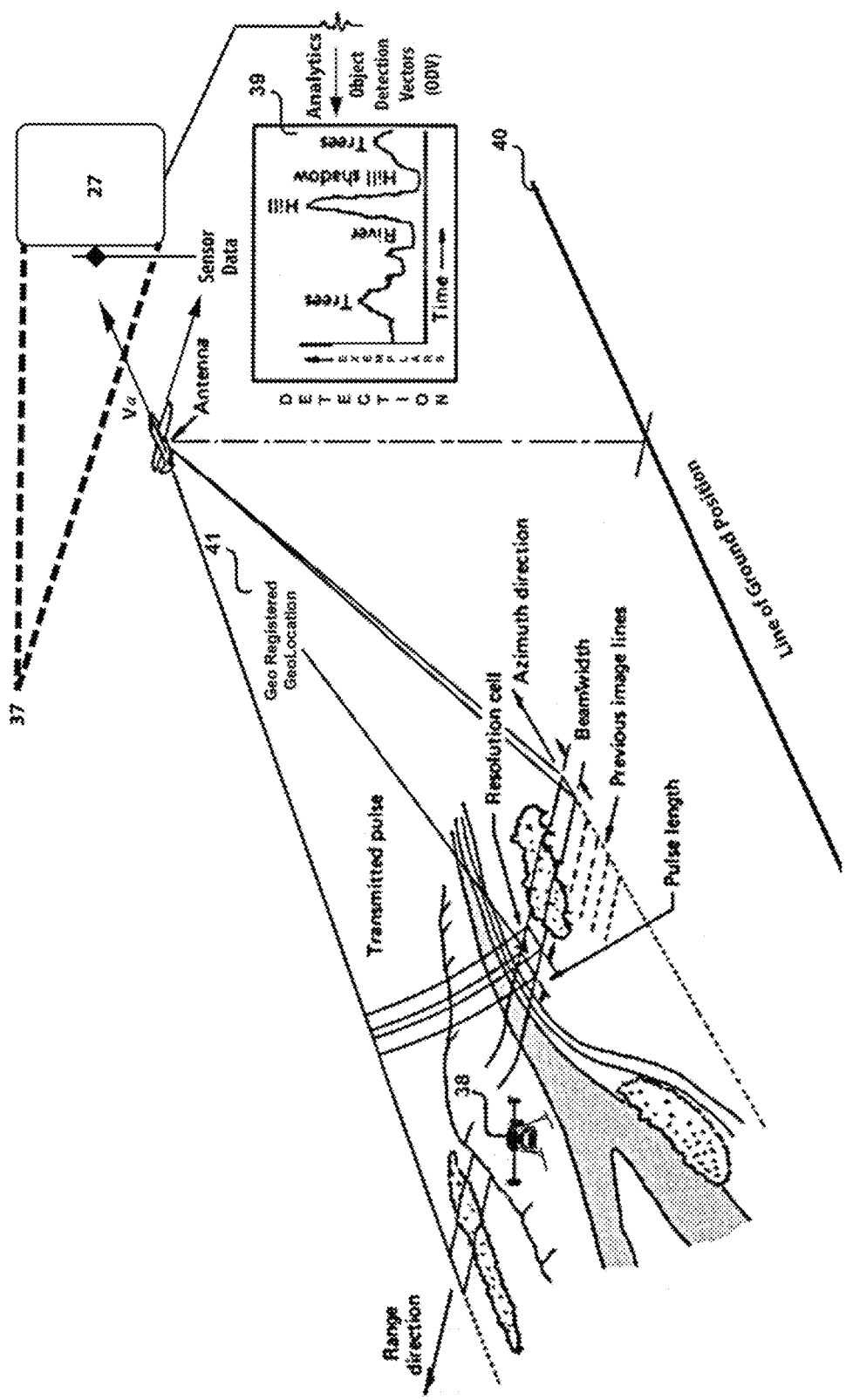

FIG. 5A-5C Aerial Embodiment of Portable Apparatus presents to those skilled in the art an overview of one example: applying the present invention to a mobile vehicular user solution. The invention has a multiplicity of other embodiments for application for both stationary and mobile surveillance. This embodiment FIG. 5A describes an aerial example of a mobile vehicular application of the present invention. The vehicles shown here (37) has installed the Sensor Data Fusion Portable Apparatus of the present invention, previously described in FIG. 2 (27). Whereas the apparatus is processing incoming data from a multiplicity of sensors, both locally to the large aerial vehicle (37) and remotely via data communication uplink from smaller service drones (38), using the Sensor Data Fusion Method of FIG. 1 in entirety performing the processes of Decision Support Software Architecture described in FIG. 3. Whereas in the completion of process task, the operating program of the present invention will call upon the services, examples of which are included in FIGS. 4 (35) and (36) and described previously. Streaming data is sourced through sensors of different modalities. The data is correlated using the Geo Registration and Geo Location data from the sensor outputs (41). The correlated data is analyzed using the data processing methods described previously. The processed data is then interpreted as detections as the sensors collect data over time (39) as the sensors collect data along the line of position (40) and thence presented to results to the after Data Fusion Method Stage 5 (8) on the graphical user interface (34).

Figure 6:
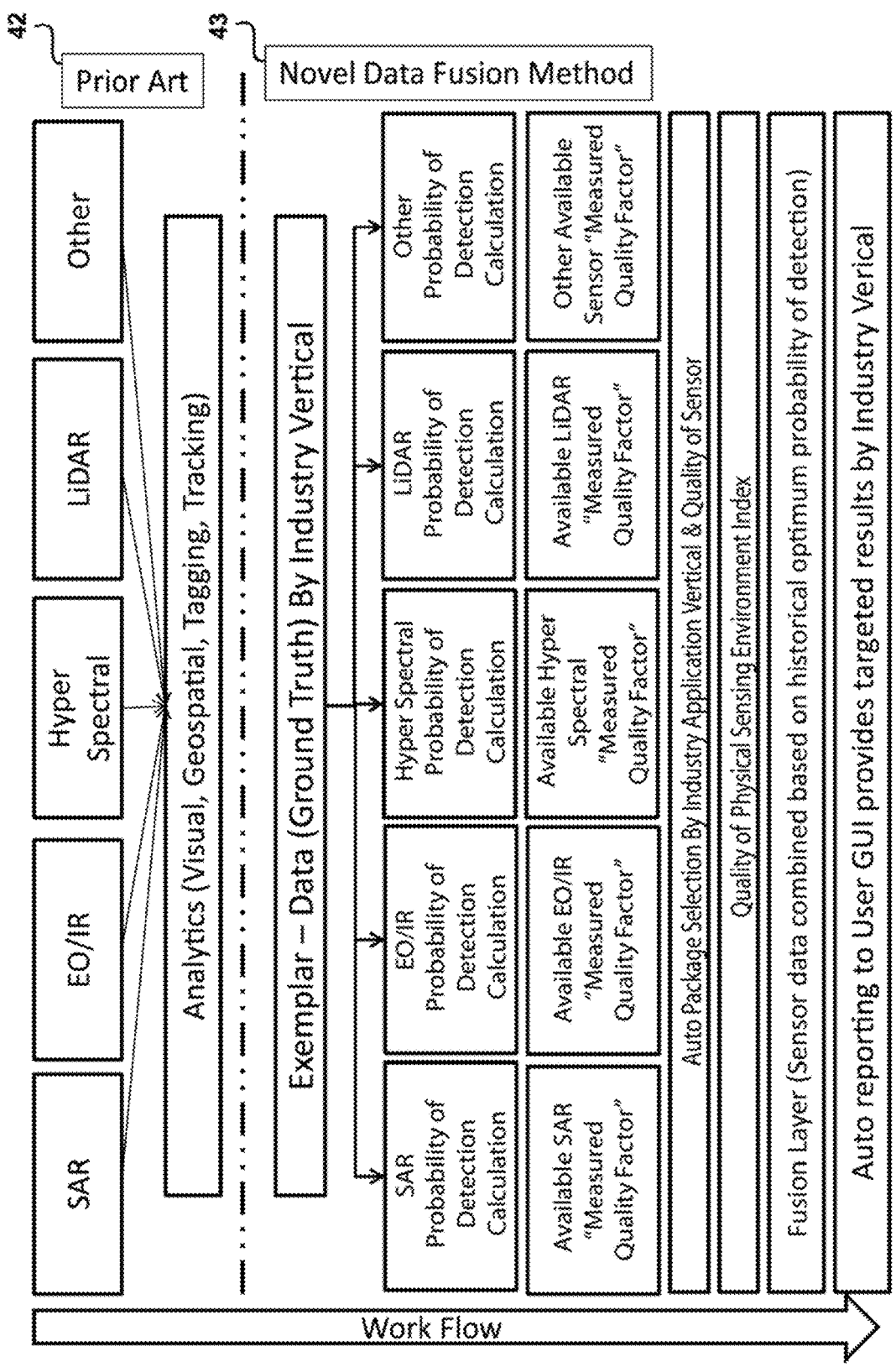
FIG. 6 is a diagram of the novel data fusion method work flow included to show enhanced methods as compared to work flows used in prior art.
Figure 7:
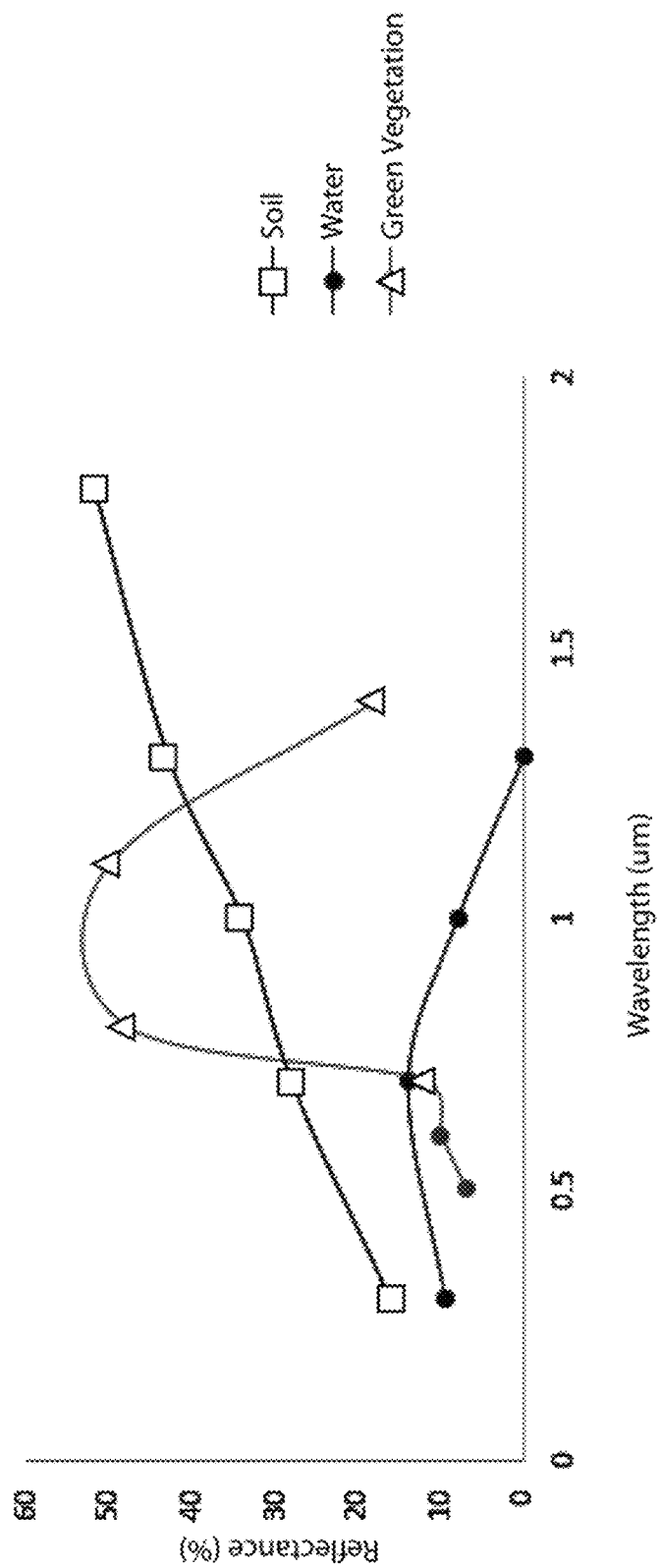
FIG. 7 shows the spectral signatures for use in identifying various background elements from an exemplary agricultural scan.

FIG. 6 Novel Data Fusion Method Work Flow presents to those skilled in the art the present invention extends the effectiveness of prior art to include several novel extensions not heretofore put into practice by others. The novel method and apparatus of the present invention (43) is unlike the approach of prior art (42) as, for example, the invention combines several elements not heretofore combined and in such a way never before combined. Use of sensor data analytics by others has been limited to combining image data or layering image data based on Geo Location (42). The present invention extends analysis and fusion of data to a more refined level. This novel extension is accomplished by adding several unique approaches into a Novel Data Fusion Method (43). The aforementioned method compares incoming sensor data to Ground Truth exemplars from historical and experiential sources pre-analyzed and stored as a library of exemplar data on an application and industry basis. The exemplar data is then used as a filter or screening of incoming streaming data from each sensor modality to identify object detections (5),(7) by way of intelligent agents (2),(3),(4),(6),(8). The present method then automatically calculates the quality of event detection and renders a detection quality assessment to the user or end process based on use of two novel factors. The first novel measurement of the event detection is in the form of a probability of detection based on exemplars yielding spatial image contextual analysis and signature (for those sensors where signatures are possible) for each modality individually. The results are factored using measured or industry knowledge of the sensor detection competitive performance across the multiplicity of possible sensors for that sensor mode (e.g. High, Medium, Low resolution). The results are reported in (33) and presented to the user via graphical user interface Dashboard (34).

Figure 8:
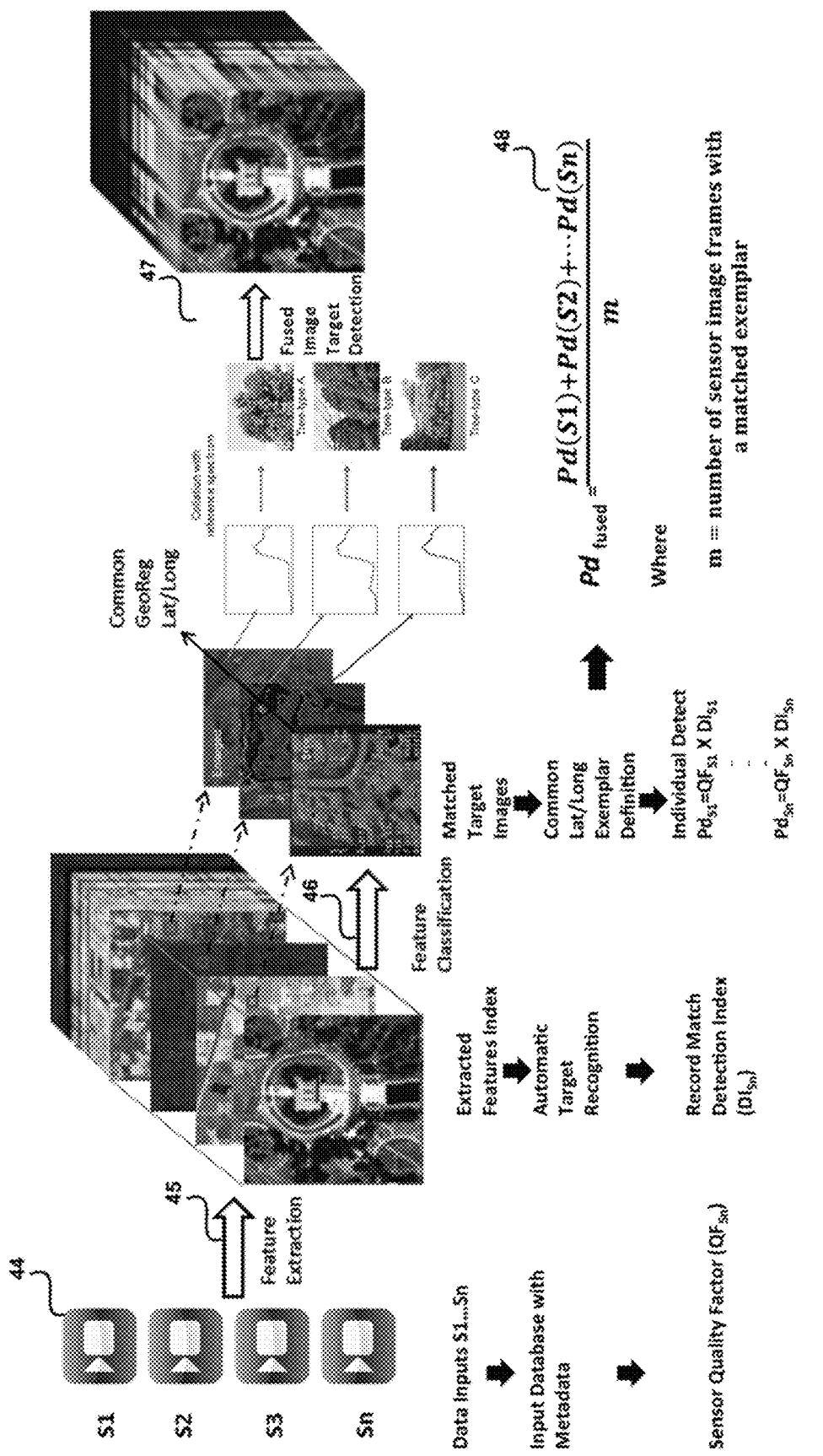
FIG. 8 depicts an exemplary method for fusing the data from multiple sensors (S1-Sn), assigning a sensor quality factor (QFsn) for each, extracting features or elements from the images or data and matching those features or elements with exemplars in a library to assign a detection index (DIsn), then steps for geo-locating the target images and applying intelligent agent algorithms to determine the probability of correct detection from the fused data (Pd-fused).

In FIG. 8, an example of the algorithms and processes for determining a Fused Probability of Detection (Pd) is shown. The invention uses $3^{rd}$ party software for segmentation of images—creating the boundaries around every object in an image including objects within boundaries as well. e.g. one can see the outline of your shirt, one can see the wrinkles on your shirt, one can see the pocket on your shirt, the buttons etc. In this fashion the system knows there is something there or not including what items are foreground and what items are background. Immediately upon segmenting objects in an image or frame of video the software begins abstracting those objects in order to attempt to match them with concepts called notions (think broadly of classification). If an area in an image has what appears to be a blue or gray area at the top of the image with fuzzy objects and a yellow ball the COTS video analytics subsystem identifies this as sky. Notions start with basic shapes like triangle, circle, rectangle, artificial, natural and moves on to more complex concepts. Notions are ontological (hierarchical) and can combine together when they have a relationship to give more complex mean. For example, if the software recognizes sky, sand and sea then it gives the notion beach. OR if it recognizes an oval with two circles, a triangle and a rectangle it knows that is a face. Analytical algorithmic data fusion techniques are then applied to the data including, but not limited to Bayesian analysis, deep learning neural nets, segmentation analysis and Markov modeling and probability analysis.

In another aspect, the invention involves two types of fusion: horizontal and vertical. Horizontal fusion takes data from two or more different types (e.g., visual, geospatial, weather and conditions, speed, heading, direction, signals and imagery) and merges them into a single analysis and visualization of that data. Vertical fusion takes different types of pixel data (e.g., infrared and color imagery) and merges them together. The present invention makes use of both horizontal and vertical fusion.

Image (vertical) fusion takes different types of images from different sensors (e.g. an SD color image and an HD black and white image) and merges the data together to create an HD color image. One process to support this fusion process is called PANTONE sharpening. PANTONE sharpening breaks each image into channels which represent the colorization parameters for that image. It then allows an interleaving of those channels (a very challenging process) to produce imagery results that can be better than the individual images alone.

As discussed above, FIG. 8 shows a method using the present invention for (44) detecting and (45) identifying objects in an image, using image context information and data (46), comparing (47) individual sensor data or images to exemplars and signatures stored in the data library (for example, tree types), and wherein the processing subsystem looks up a quality factor value, contained in the sensor quality library, assigned to each sensor based on measured or calculated sensor performance or characteristics. The system uses an algorithm (48) to combine the quality factor for each type and quality of sensor with the detection index value, indicating the quality of the match between the input data and the exemplar and signature data. The result is recorded in the metadata for specific images and sensor data having been scaled to be recorded as a fused probability of detection (Pd). The description and examples presented above and the contents of the application define and describe examples of the many combinations, apparatus, and methods that can be produced or used according to the teachings herein. None of the examples and no part of the description should be taken as a limitation on the scope of the inventions herein as a whole, or of the meaning of the following claims.

What is claimed is:

1. A portable sensor fusion apparatus for the simultaneous analysis of multiple and different data inputs from multiple and different sensors, the sensors detecting at least one user defined image, the apparatus comprising a computer-comprising:

a data receiving subsystem capable of receiving streaming inputs from a multiplicity of sensors, and capable of indexing and storing the data and the associated geo-location information for where the data was collected;

a data library subsystem for storing exemplars and signatures for each of the types of sensor data used, including images for objects of interest, spectral radiance from locations of interest, and images of background objects;

a processing subsystem for detecting and matching objects in an image received from a sensor, detecting and matching objects of interest from the data library, the custom software capable of estimating a match probability for individual sensor data or images to the exemplars and signatures stored in the data library, and wherein the processing subsystem is further capable of assigning a new probability of detection by combining the match probability with a quality factor value for specific images and sensor data received from two or more of the streaming inputs, the quality factor value used to determine a new modified probability of detection value for matching specific images or data received, wherein a quality factor is assigned to each data set collected from each sensor and is based upon the reliability and performance of the sensor in comparison to the other sensors and Meta data (capable of high, medium and low detection reliability);

an indexing subsystem to correlate and store detection events with geo spatial information combined with probability of detection, sensor input quality factor and environmental factors to fuse the results of said analysis;

and a graphical user interface to display an image along with the detection events and geolocation associated with it.

2. The apparatus of claim 1, wherein a high performance digital image camera is used as one sensor and an infrared camera is used as a second sensor.

3. A method of surveilling an area comprising attaching the apparatus of claim 1 to a vehicle.

4. The method of claim 3, where only fused composite images are transmitted from the apparatus in the vehicle to a display for an operator.

5. A method of creating a composite of input images to form a fused, composite image data set comprising:
providing a sensor fusion apparatus for the simultaneous analysis of multiple and different data inputs from multiple and different sensors, the sensors detecting at least one user defined image, the apparatus containing a library of exemplar data;
selecting a spectral wavelength for detecting an image from one sensor used;
selecting a radar input at a frequency consistent with reflectivity in either light foliage or heavy foliage for another sensor used;
recording an image with visible light, infrared, and radar sensors;
geo-registering the image;
performing an image based pixel level detection of the "first" through "n" optical sensor images and supplementing the image data with spectral and radar data to create a composite image;
determining if an equivalent matched image occurred across the sensors used or in the library of exemplar data;
and displaying the composite image.

6. The method of claim 5, wherein the composite image includes forestry or agricultural data.

7. The method of claim 5, wherein the composite image includes border or geographic boundary data.

8. The method of claim 5, wherein the probability of detection (Pd) and probability of false alarm (Pfa) is determined for each fused composite data set.

9. The method of claim 8, wherein information on the Pd and Pfa is displayed to an operator in the composite image.

10. The method of claim 5, wherein the fused composite image is generated by a remote high performance computer in communication with the multiple and different sensors.

11. The method of claim 5, wherein a probability of detection is calculated for each layer of sensor data, and a composite probability of detection is calculated for the fused image or data.

12. A method of creating a composite of input images to form a fused, composite image data set comprising:
providing a sensor fusion apparatus for the simultaneous analysis of multiple and different data inputs from multiple and different sensors, the sensors detecting at least one user defined image, the apparatus containing a library of exemplar data;
selecting a sensor for detecting coronal discharges;
selecting an infrared sensor consistent with powerline transmission monitoring;
recording an image from the sensors;
geo-registering the image;
performing an image based pixel level detection of the first through "n" optical sensor images and supplementing the image data with spectral and coronal discharge data to create a composite image;
determining if an equivalent matched image occurred across the sensors used or in the library of exemplar data;
and displaying the composite image.

13. The method of claim 12, wherein the exemplar data includes images of powerline locations in order to monitor the conditions of the powerline.

14. The method of claim 12, wherein the probability of detection (Pd) and probability of false alarm (Pfa) is determined for each fused composite data set.

15. The method of claim 14, wherein information on the Pd and Pfa is displayed to an operator in the composite image.

16. The method of claim 12, wherein the fused composite image is generated by a remote high performance computer in communication with the multiple and different sensors.

17. The method of claim 12, wherein a probability of detection is calculated for each layer of sensor data, and a composite probability of detection is calculated for the fused image or data.

* * * * *